(No Model.)
D. J. SHELDRICK.
SPROCKET WHEEL.
No. 585,710.  Patented July 6, 1897.
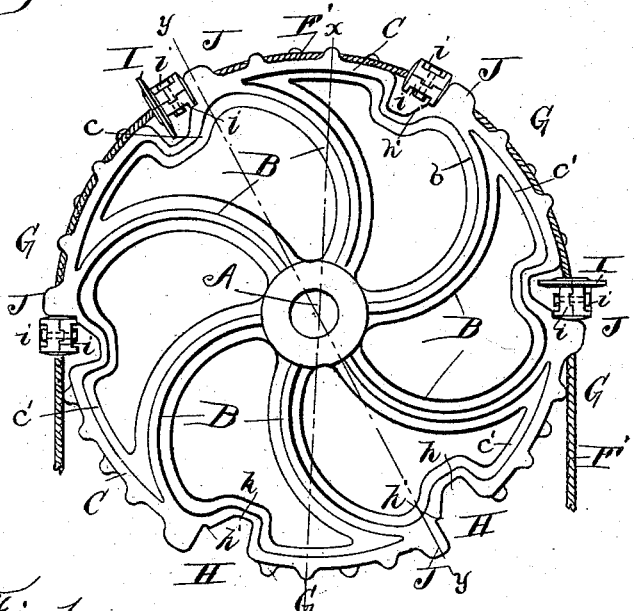
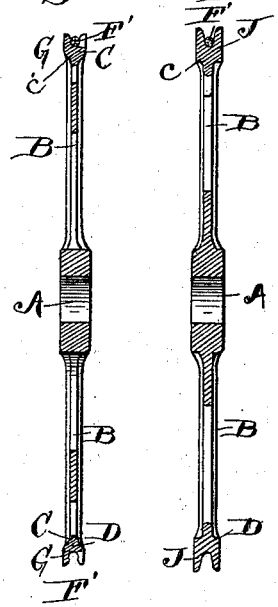
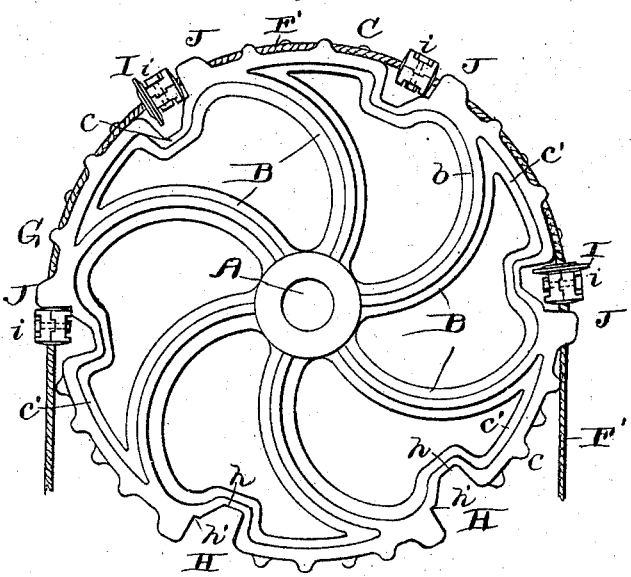
Witnesses:
Inventor:—
David J. Sheldrick

UNITED STATES PATENT OFFICE.

DAVID J. SHELDRICK, OF COLUMBUS, OHIO, ASSIGNOR TO JOSEPH A. JEFFREY, OF SAME PLACE.

SPROCKET-WHEEL.

SPECIFICATION forming part of Letters Patent No. 585,710, dated July 6, 1897.

Application filed November 28, 1893. Serial No. 492,276. (No model.)

*To all whom it may concern:*

Be it known that I, DAVID J. SHELDRICK, a citizen of the United States, residing at Columbus, in the county of Franklin and State of Ohio, have invented certain new and useful Improvements in Sprocket-Wheels, of which the following is a specification, reference being had therein to the accompanying drawings.

This invention relates to improvements in supporting and power-transmitting wheels to be used in connection with conveyers or carriers comprising cables and attachments secured thereto for the purpose of carrying or conveying materials of any of several sorts from place to place.

The objects of the invention are to provide a wheel which shall have a minimum amount of metal and yet have sufficient strength to accomplish the purposes aimed at; also, one which shall permit the cable and the wheel to clear themselves from foreign materials that tend to accumulate in the guide-passage for the cable and yet have the parts so arranged that the cable will be properly held in place at all times upon the periphery, and, further, a wheel having its spokes, hub, and rim so related and shaped that it can be cast without seriously altering the "pitch" dimensions and which shall bring the pressure to bear directly behind the cable sprockets or attachments on such lines as to prevent the fracturing of the spokes.

Figure 1 is a side elevation of a portion of a conveyer or carrier comprising wheels embodying my improvements. Fig. 2 is a similar view showing the sprockets and attachments differently pitched relatively to the wheel. Fig. 3 is a transverse section on the line $x\ x$. Fig. 4 is a section on the line $y\ y$.

In the drawings the wheel is shown as having a central hub A for securing it to the shaft and from which the spokes B extend outward. The rim of the wheel is indicated as a whole by C. It is formed with the wider part $c$ and the relatively thinner or web-like portion $c'$. The peripheral surfaces are formed on the arcs of a circle, so that the wire cable F' shall be properly supported when it bears against the wheel and be prevented from having sharp bends or curves at any point, thus avoiding the cutting or breaking of the wires or strands of the cable.

At suitable pitch intervals the rim is depressed or recessed to form gaps H, which are of dimensions that correspond to the attachments or devices secured to the cable for transmission or conveying purposes.

To insure that the cable shall be held properly in place on the peripheral surfaces and prevent any lateral slipping, I employ radially-projecting lugs G G, situated alternately on opposite sides of the lines of the cable. Opposite each of these lugs there is an open space—that is to say, nothing projects outward from the peripheral line—and consequently there is a free passage for the escape of dirt or any foreign material which may be brought to the wheel by the cable. At the same time there are enough of the lugs to insure that the cable cannot itself move laterally in either direction.

I am aware of the fact that wheels have been used which were made with lugs projecting radially at the sides of the carrier which fits between them, but the lugs in such earlier wheels were not staggered or arranged alternately for the purposes at which I aim.

The cable is provided with attachments, shown as being formed of metal blocks or hub-pieces $i\ i$, firmly clamped to the cable, and a suitable number of these are formed with or secured to the flights, scraper-plates, or disks I. The pitch distance between these flights or attachments may correspond closely to that of the gaps or recesses H of the wheel, as is shown in Fig. 2, so that when the parts are in motion the attachments successively seat themselves in said recesses; but for important reasons I prefer to have the pitch distances between the cable attachments shorter than those between the wheel recesses or gaps H and make the peripheral width of the gaps considerably greater than the length of the attachments, as is shown in Fig. 1.

I have found that the variations in length of the cable due to expansion and contraction and also to wear and stretching are such that it is difficult to have the attachments continue to track properly on the wheel for any considerable period of time if the two parts are pitched closely together, as in Fig. 2. I have succeeded by using clamping devices such as are shown in my Patent No. 509,251, dated November 21, 1893, in preventing the attachments from slipping at all on the cable, and can therefore allow for any one of them to carry the whole load. When the parts are pitched as in Fig. 1, one of the attachments will be in positive engagement with the wheel, while the others may be out of such engagement. As soon as the engaging one leaves the wheel the next may come into positive engagement, and so on through the series.

Each gap or recess H is formed with a relatively deeper part $h$ and a shallower part $h'$, the latter having a well-defined shoulder upon which the attachment or clamp can rest itself on one end, the other end being left free, which insures that the scraper or flight I shall be so held that it can accommodate itself properly to the position of the cable and not cause any bending or straining.

On one side only of each gap there are driving-teeth J J, and it will be seen that the parts are so arranged that as these teeth come into contact with the cable they do so immediately behind the attachments and bear tangentially against their ends.

What I claim is—

1. The combination, with a cable having a series of attachments secured thereon at regular intervals, of a wheel comprising a hub, a rim having gaps or recesses H formed therein, each of said gaps having a seat $h'$ formed in one of its walls beyond the inner wall of the gap, substantially as and for the purpose set forth.

2. The combination with a cable having a series of attachments secured thereon at intervals, of a wheel comprising a hub, a rim having a series of teeth J, and gaps or recesses H at one side of said teeth, each of said gaps having a relatively deep portion $h$ and a seat $h'$ formed in the wall adjacent to the tooth J and at a depth less than that of the portion $h$, and spokes connecting the rim and hub, substantially as set forth.

In testimony whereof I affix my signature in presence of two witnesses.

DAVID J. SHELDRICK.

Witnesses:
WM. FRITSCHE,
RUFUS HUTCHINS.